United States Patent [19]

Sutt, Jr.

[11] Patent Number: 4,540,678
[45] Date of Patent: Sep. 10, 1985

[54] CARBON MOLECULAR SIEVES AND A PROCESS FOR THEIR PREPARATION AND USE

[75] Inventor: Robert F. Sutt, Jr., Johnstown, Pa.

[73] Assignee: Calgon Carbon Corporation, Pittsburgh, Pa.

[21] Appl. No.: 561,012

[22] Filed: Dec. 13, 1983

Related U.S. Application Data

[63] Continuation-in-part of Ser. No. 415,103, Sep. 7, 1982, abandoned.

[51] Int. Cl.$^3$ ...................... B01J 20/20; C01B 31/08; C01B 31/10; B01D 53/02
[52] U.S. Cl. .......................................... 502/5; 55/68; 55/75; 423/445; 423/449; 502/180; 502/416; 502/418; 502/420; 502/432; 502/437
[58] Field of Search ............... 502/180, 416, 418, 420, 502/432, 437, 5; 264/29.1; 423/445, 449; 201/25, 32

[56] References Cited

U.S. PATENT DOCUMENTS 4,420,415  12/1983  Yuki et al. ........................... 423/445

FOREIGN PATENT DOCUMENTS 37-17809  11/1962  Japan .................................. 423/449
2086867A  5/1982  United Kingdom ................ 423/460

Primary Examiner—P. E. Konopka
Attorney, Agent, or Firm—R. Brent Olson; William C. Mitchell; Michael C. Sudol, Jr.

[57] ABSTRACT

The instant invention is directed to a process for the continuous manufacturing of carbon molecular sieves having average effective pore diameters of from 2 to 15 Angstroms which comprises continuously feeding a charred naturally occurring substrate to a means for heating said substrate and heating said substrate under non-activation conditions, without the use of an externally added pore blocking substance, at a temperature range of about 900° F. (482° C.) to 2000° F. (1093° C.) for a time period of about 5 to 90 minutes.

The instant invention is also directed to a carbon molecular sieve, useful for separating gas or liquid mixtures containing components of at least two different molecular diameters, molecular weights or molecular shapes which has the following physical characteristics:

(a) an apparent density of from 0.60 to 0.70 g/cc,
(b) an oxygen diffusivity ($\times 10^{-8}$) of from 500 to 900 cm$^2$/sec,
(c) an oxygen/nitrogen selectivity ratio of from 5.0 to 8.5
(d) an oxygen capacity of from 4.00 to 6.00 cc/cc, and
(e) an average effective pore diameter of about 3 to 5 Angstroms.

13 Claims, 1 Drawing Figure

CARBON MOLECULAR SIEVE MANUFACTURING SYSTEM

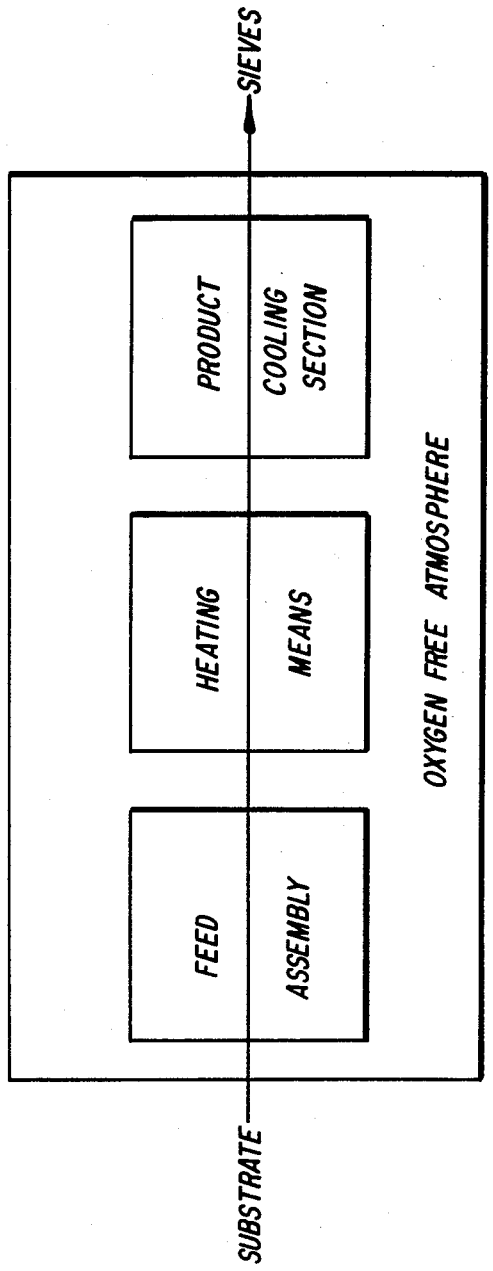

CARBON MOLECULAR SIEVES AND A PROCESS FOR THEIR PREPARATION AND USE

This application is a continuation-in-part of U.S. Ser. No. 415,103, filed Sept. 7, 1982 now abandoned.

BACKGROUND OF THE INVENTION

Carbon molecular sieves are porous substrates with an open-network structure of controlled molecular dimension which may be used to separate mixtures of small (i.e. in diameter, weight or shape) molecular gases or liquids from larger molecular sized gases or liquids based on a difference in molecular size or a difference in diffusivity rates. See for example, Grant, U.S. Pat. No. 3,884,830 and references cited therein.

Carbon molecular sieves have been prepared from a variety of substrates by a number of different manufacturing processes. See for example, Mason et al., U.S. Pat. No. 3,222,412, employing anthracite coal, elevated temperatures and an inert atmosphere; Munzner et al., U.S. Pat. No. 3,801,513, employing coke or coconut shells, elevated temperatures and pore blocking by carbon deposition; Yuki, U.S. Pat. No. 4,046,709 employing vinylidene chloride copolymers and elevated temperatures; and Vesterdal, U.S. Pat. No. 2,556,859 employing bituminous coal or coconut shells, elevated temperatures and an inert atmosphere.

Carbon molecular sieves have generally been prepared in an externally fired rotary kiln or other similar batch-type furnace. The major difficulties associated with the noncontinuous batch-type manufacture of carbon molecular sieves are (1) the difficulty of maintaining furnace atmospheric and temperature limits for the control of sieve pore diameter and (2) the product variability from batch to batch, i.e., quality control. See Munzner et al., U.S. Pat. No. 3,962,129.

Carbon molecular sieve average effective pore diameters are generally governed by the following factors:
(A) furnace temperature
(B) furnace atmosphere
(C) residence time
(D) presence or absence of a pore blocking substance.

Control of the first two conditions has been a major problem associated with the prior art noncontinuous, batch-type manufacturing processes.

The use of a continuous feed type heating means, as described herein, overcomes the difficulties associated with atmosphere and temperature control of noncontinuous, batch processes, thereby assuring pore diameter selection and overall sieve quality control. The instant process also generates carbon sieves with better selectivity and capacity values than prior art batch processes.

BRIEF DESCRIPTION OF THE DRAWINGS

The FIGURE is a schematic diagram of the system employed herein for the continuous manufacture of carbon molecular sieves.

SUMMARY OF THE INVENTION

The instant invention is directed to a process for the continuous manufacturing of carbon molecular sieves having average effective pore diameters of from 2 to 15 Angstroms which comprises continuously feeding a charred naturally occurring substrate to a means for heating said substrate and heating said substrate under non-activation conditions, without the use of an externally added pore blocking substance, at a temperature range of about 900° F. (482° C.) to 2000° F. (1093° C.) for a time period of about 5 to 90 minutes.

The instant invention is also directed to a carbon molecular sieve, useful for separating gas or liquid mixtures containing components of at least two different molecular diameters, molecular weights or molecular shapes which has the following physical characteristics:
(a) an apparent density of from 0.60 to 0.70 g/cc,
(b) an oxygen diffusivity ($\times 10^{-8}$) of from 500 to 900 cm$^2$/sec,
(c) an oxygen/nitrogen selectivity ratio of from 5.0 to 8.5
(d) an oxygen capacity of from 4.00 to 6.00 cc/cc, and
(e) an average effective pore diameter of about 3 to 5 Angstroms.

The instant invention is also directed to a process for separating gas or liquid mixtures containing components of at least two different molecular diameters, molecular weights or molecular shapes, comprising passing the liquid or gas through a molecular sieve having:
(a) an apparent density of from 0.60 to 0.70 g/cc,
(b) an oxygen diffusivity ($\times 10^{-8}$) of from 500 to 900 cm$^2$/sec,
(c) an oxygen/nitrogen selectivity ratio of from 5.0 to 8.5
(d) an oxygen capacity of from 4.00 to 6.00 cc/cc, and
(e) an average effective pore diameter of about 3 to 5 Angstroms.

DETAILED DESCRIPTION

The present invention is directed to a process for the manufacture of carbon molecular sieves. The novel process of this invention preferably involves the steps of continuously feeding a charred naturally occurring substrate to a means for heating said substrate and heating said substrate under non-activation conditions, without the use of an externally added pore blocking substance, at a temperature range of about 900° F. to 2000° F. for a time period of about 5 minutes to 90 minutes. Carbon molecular sieves of from 2 to 15 Angstrom pore diameter may be produced by this process. The novel carbon molecular sieves of this invention have an average effective pore diameter of about 3 to 5 Angstroms.

The terms "externally added pore blocking substance" as used herein, refer to those substances recognized in the art as deposits applied to a carbon substrate prior to or during heating to constrict the substrate micropores. See, for example, U.S. Pat. Nos. 3,801,513; 3,222,412; 2,761,822; Canadian Pat. No. 608,038 and Great Britain Pat. No. 1,138,307.

In each of these references, the micropores of the carbon substrate are constricted by some added material. These materials may be solids, liquids or gases which may be subsequently carbonized by heating to leave pure carbon constricting the micropores of the substrate.

Steam, carbon dioxide, oxidizing agents and the like, cause activation at temperatures in excess of 500° C. (oxygen—greater than 500° C., steam—greater than 750° C., carbon monoxide or carbon dioxide—greater than 1000° C.). The phrase "non-activation conditions" as used herein means oxygen-free, moisture-free, and oxidation-free. The use of an inert gas purge is one way to pevent activation, by sweeping away the oxygen. The phrase "oxygen-free" as used herein refers to a furnace atmosphere having a maximum oxygen content of 500 ppm, preferably 100 ppm or less, by volume, prior to and during the manufacture of the carbon sieves.

The phrase "charred naturally occurring substrate" refers to those non-cokable or decoked materials occurring in nature useful for preparing carbon molecular sieves by the process described herein. Typical non-cokable naturally occurring substrates include, coconut shells, babassu nut shells, anthracite, high ranking bituminous coals and other non-cokable naturally occurring substrates recognized in the art. Decoked substrates include oxidized (decoked) medium volatile bituminous and lignite coals and other decoked substrates recognized in the art. The preferred substrates are coconut char and bituminous coal. Polymeric substrates are specifically excluded by this definition.

The substrates must not have undergone activation prior to use in the process or during the process. Activation will cause pore expansion, detrimental to the desired pore properties.

The charred substrates are prepared merely by heating the shells at a temperature sufficient to char (i.e. carbonize) the shells. Reduced oxygen conditions are necessary to prevent complete burning. A process for charring is described in U.S. Pat. No. 3,884,830, which is hereby incorporated by reference. The charred substrates, however, in contrast to U.S. Pat. No. 3,884,830, are not activated in the present invention.

The charred substrate is generally crushed and screened to the desired mesh size. Mesh size is not a critical factor. U.S. Sieve sizes of from $3 \times 6$ to $50 \times 100$ may be employed. For nut chars the mesh size generally used was $8 \times 30$ U.S. Sieve.

The coal substrates may require agglomeration. Agglomerated substrate is a mixture of 30 to 98 percent, by weight, raw coal and 2 to 70 percent, by weight, ground thermal binder, such as coal tar pitch, petroleum pitch, asphalt, bitumin or lignin. The agglomerate is then baked at up to 50 to 500° C., preferably stepwise heating, in the presence of oxygen. The thermal binder is devolatized at this temperature and the chemical composition of the thermal binder is changed to a crusty product to affect binding. 500° C. should not be exceeded so that activation will not occur. Agglomeration techniques are adequately described in U.S. Pat. No. 3,884,830, which is hereby incorporated by reference. Following agglomeration, the substrates may be sized and screened as desired.

Carbon molecular sieve average effective pore diameters are generally governed by the following factors:
(A) furnace temperature
(B) furnace atmosphere
(C) residence time
(D) presence or absence of a pore blocking substance.

In the present invention the control of pore diameter determinative factors was achieved by modifying the heating time, temperature and atmosphere processing conditions. A preferred heating means for carrying out this invention is described in U.S. Pat. Nos. 4,050,900 and 3,648,630 which are herein incorporated by reference. Other heating means that may prove useful in the instant process include indirectly fired rotary kilns, the Selas type indirectly fired or electrically fired screw conveyor kiln or some of the various types of metal treating furnaces (e.g., Lindberg) known in the art as modified for continuous type processing.

The preferred system consists of a feed assembly, the heating means, and a product cooling section (see the FIGURE). Air locks are located between the feed assembly and the heating means and on the discharge end of the product cooling section. A preferred heating means is an electrically fired continuous transport type furnace having two independently controlled hot zones. Each hot zone contains silicon carbide infrared glow bars controlled by centrally located chromel-alumel thermocouples.

The furnace atmosphere is maintained in an oxygen-free condition during the manufacturing process by purging of the system with an oxygen-free inert gas such as nitrogen. Purging may be accomplished by either cocurrent or countercurrent inert gas flow relative to substrate feed flow. Countercurrent purging is preferred. Off gases containing combustible components are destroyed in an afterburner. The system back-pressure is controlled by means of a valve located in the stack between the furnace and the afterburner.

In conducting the instant process the furnace was initially brought to the desired temperature under an inert gas purge. Belt speed was set to adjust furnace residence time. The furnace generally reached a steady state in 6 to 8 hours and then feed was begun. Decoked or non-coking substrate was fed through the system under a blanket of inert gas thereby producing carbon molecular sieves. Completion of a furnace run was accomplished by turning the feed system off and clearing the furnace. Process conditions for producing sieves having average effective pore diameters of from 2 to 15 Angstroms were as follows:

|  | Range | Preferred |
|---|---|---|
| (A) temperature | 900° to 2000° F. | 1400 to 1900° F. |
| (B) residence time | 5 to 90 min. | 5 to 30 min. |
| (C) feed rate | 15 to 60 lb/hr | 30 to 50 lb/hr |
| (D) $N_2$ purge (linear velocity) | 3.5 to 8.1 FPM | 4.6 to 6.9 FPM |

If the furnace temperature was adjusted, about one to two hours was generally required for the furnace to equilibrate. Furnace temperature and residence time were found to be inversely related. Long residence times coupled with low temperatures produced sieves similar to those manufactured at high temperatures with shorter residence times.

To be effective as a molecular sieve, the product must have (1) a high selectivity ratio and (2) a high capacity value.

The terms selectivity and capacity refer to diffusivity characteristics of a molecular sieve. Gas diffusivity refers to the speed with which a gas sample passes into or out of the pores of a particular molecular sieve. Selectivity is defined as the ratio of two gas diffusivity values. A high selectivity value indicates that the sieve readily discriminates between gas mixture components based on both kinetic and thermodynamic factors. A high capacity value indicates that a small amount of molecular sieve will adsorb a large volume of gas.

In general, it has been found that smaller, lighter molecules are adsorbed more rapidly by carbon molecular sieves than larger, heavier molecules. A typical listing of molecules in order of decreasing diffusivity into carbon molecular sieves is as follows: hydrogen, helium, oxygen, carbon monoxide, carbon dioxide, ammonia, nitrogen, argon, methane, hydrogen sulfide, ethylene, ethane, propylene, ethanol, propane, n-butane, isobutane, n-pentane, isopentane, o-xylene, m- xylene, p-xylene, n-hexane, 2-methyl pentane, n-heptane. This listing is not complete, but is meant merely as a rule of thumb. Some variation in the order of diffusivities should be expected, depending upon the specific adsorbent used. However, the adsorption rate differences due to molecular diameter, molecular shape, molecular velocity and/or adsorbate/adsorbent interactions serves as a basis for separating gaseous or liquid mixtures. The greater the difference in adsorption rate of the mixture components, the easier it is to separate the mixture. The terms "molecular diameter", "molecular shape", "molecular velocity" and "adsorbate/adsorbent intereactions" are well understood by those familiar with transport phenomena and adsorption theory. Nevertheless, the following works are hereby included for reference:

(1) R. B. Bird, W. E. Stewart and E. N. Lightfoot, *Transport Phenomena*, J. Wiley & Sons, New York (1960).
(2) J. O. Hirshfelder, C. F. Crentis and R. B. Bird, *Molecular Theory of Gases and Liquids*, J. Wiley & Sons, New York (1954).
(3) W. A. Steele, "The interaction of Gases with Solid Surfaces", *The International Encyclopedia of Physical Chemistry and Chemical Physics*, Topic 14, Volume 3, Pergamon Press, Oxford (1974).
(4) A. W. Anderson, *Physical Chemistry of Surfaces*, John Wiley & Sons, New York (1976).

The "average effective pore diameter" can be inferred from the diffusivity or capacity of the sieve for gases of known molecular size.

The novel carbon molecular sieves of the present invention have the following physical characteristics:

|   |   | Range | Preferred |
|---|---|---|---|
| (A) | oxygen diffusivity $\times$ $10^{-8}$ cm$^2$/sec | 500–900 | 650–750 |
| (B) | oxygen/nitrogen selectivity ratio | 5.0–8.5 | 7.0–7.5 |
| (C) | oxygen capacity cc/g | 6.00–8.00 | same |
| (D) | oxygen capacity cc/cc | 4.00–6.00 | same |
| (E) | apparent density g/cc | 0.60–0.70 | 0.64–0.70 |
| (F) | average effective pore diameter about 3 to 5 Angstroms. | | |

The carbon molecular sieves of the instant invention have iodine numbers of less than 450.

The following examples demonstrate the process for preparing novel carbon molecular sieves from sized (8×30 U.S. Sieve) Phillipine coconut char (Montenegro) having an apparent density of about 0.61 g/cc. Process conditions were as follows:

|   |   | Range | Preferred |
|---|---|---|---|
| (A) | temperature | 1700° to 2000° F. | 1800 to 1900° F. |
| (B) | residence time | 5 to 90 min. | 15 to 30 min. |
| (C) | feed rate | 15 to 60 lb/hr | 30 to 50 lb/hr |
| (D) | N$_2$ purge (linear velocity) | 3.5 to 8.1 FPM | 5.8 to 8.1 FPM |

While these examples are directed to a preferred embodiment, it is expected that other non-coking or decoked substrates will produce a carbon molecular sieve having the characteristics described herein when employing process parameters similar to those described herein.

The following examples merely illustrate the present invention. They are not intended to limit the scope of the invention in any manner.

EXAMPLE 1

Coconut char was fed to the furnace at 30 pounds per hour. The furnace temperature was 1800° F. and the furnace residence time was 30 minutes. A constant nitrogen purge was maintained at 5.8 feet per minute (FPM).

To calculate a test gas (e.g., oxygen, nitrogen, etc.) diffusivity value the dead volume of a sample cell containing about 10 grams of carbon sieve was determined by helium expansion. The test gas was then expanded into the reevacuated sample cell from a one liter reference cell. Knowing the dead volume, adsorption (loading) of any test gas was monitored by the change in pressure of the system. These values combined with an equilibrium loading value calculated for a sieve sample after one hour (at STP) allowed the determination of a relative loading value ($L_t/L_e$). $L_t$ was the test gas loading value of a sieve sample at a given time, for example 30 seconds, and $L_e$ was the test gas loading value of a sieve sample at equilibrium. The gas diffusivity value (D) of a sieve sample was then calculated for the test gas by solving the simplified equation for diffusion into a sphere:

$$L_t/L_e = 6(Dt/\pi R_0^2)^{\frac{1}{2}} - 3Dt/R_0^2$$

where
D = gas diffusivity value
t = time in seconds
R$_0$ = mean particle radius of a carbon sieve (0.05125 cm)

See: Dedrick, R. L. and Beckmann, R. B., "Kinetics of Adsorbtion by Activated Carbon from Dilute Aqueous Solution," *Physical Adsorption Processes and Principles*, L. N. Canjar and J. A. Kostecki, eds., Vol. 63, American Institute of Chemical Engineers, New York (1967); Walker, P. L., Jr., Austin, L. G., Nandi, S. P., "Activated Diffusion of Gases in Molecular Sieve Materials", *The Chemistry and Physics of Carbon*, P. L. Walker, Jr., ed., Vol. 2, Marcel Deller, Inc., New York (1966) and Crank, J., "The Mathematics of Diffusion", 2nd Ed., Clarendon Press, Oxford (1975).

Determination of oxygen and nitrogen diffusivity values allowed for calculation of the oxygen/nitrogen selectivity ratio: S = DO$_2$/DN$_2$.

A carbon sieve having the following physical characteristics was produced:

|   |   |   |
|---|---|---|
| (A) | oxygen diffusivity $\times$ $10^{-8}$ cm$^2$/sec | 693 |
| (B) | oxygen/nitrogen selectivity ratio | 7.19 |
| (C) | oxygen capacity cc/g | 7.68 |
| (D) | oxygen capacity cc/cc | 5.29 |
| (E) | apparent density g/cc | 0.688 |

EXAMPLE 2

Coconut char was fed to the furnace at 30 pounds per hour. The furnace temperature was 1800° F. and the furnace residence time was 30 minutes. A constant nitrogen purge was maintained at 5.8 feet per minute. Gas diffusivity values were calculated as described in Example 1. A carbon sieve having the following physical characteristics was produced:

| | | |
|---|---|---|
| (A) | oxygen diffusivity × $10^{-8}$ cm$^2$/sec | 721 |
| (B) | oxygen/nitrogen selectivity ratio | 6.68 |
| (C) | oxygen capacity cc/g | 7.56 |
| (D) | oxygen capacity cc/cc | 5.22 |
| (E) | apparent density g/cc | 0.691 |

EXAMPLE 3

Coconut char was fed to the furnace at 30 pounds per hour. The furnace temperature was 1800° F. and the furnace residence time was 45 minutes. A constant nitrogen purge was maintained at 5.8 feet per minute. Gas diffusivity values were calculated as described in Example 1. A carbon sieve having the following physical characteristics was produced:

| | | |
|---|---|---|
| (A) | oxygen diffusivity × $10^{-8}$ cm$^2$/sec | 584 |
| (B) | oxygen/nitrogen selectivity ratio | 6.83 |
| (C) | oxygen capacity cc/g | 8.35 |
| (D) | oxygen capacity cc/cc | 5.58 |
| (E) | apparent density g/cc | 0.668 |

EXAMPLE 4

Coconut char was fed to the furnace at 30 pounds per hour. The furnace temperature was 1850° F. and the furnace residence time was 15 minutes. A constant nitrogen purge was maintained at 8.1 feet per minute. Gas diffusivity values were calculated as described in Example 1. A carbon sieve having the following physical characteristics was produced:

| | | |
|---|---|---|
| (A) | oxygen diffusivity × $10^{-8}$ cm$^2$/sec | 580 |
| (B) | oxygen/nitrogen selectivity ratio | 7.91 |
| (C) | oxygen capacity cc/g | 7.49 |
| (D) | oxygen capacity cc/cc | 4.82 |
| (E) | apparent density g/cc | 0.643 |

EXAMPLE 5

Coconut char was fed to the furnace at 30 pounds per hour. The furnace temperature was 1850° F. and the furnace residence time was 15 minutes. A constant nitrogen purge was maintained at 8.1 feet per minute. Gas diffusivity values were calculated as described in Example 1. A carbon sieve having the following physical characteristics was produced:

| | | |
|---|---|---|
| (A) | oxygen diffusivity × $10^{-8}$ cm$^2$/sec | 588 |
| (B) | oxygen/nitrogen selectivity ratio | 8.02 |
| (C) | oxygen capacity cc/g | 7.31 |
| (D) | oxygen capacity cc/cc | 4.99 |
| (E) | apparent density g/cc | 0.682 |

EXAMPLE 6

Coconut char was fed to the furnace at 60 pounds per hour. The furnace temperature was 1850° F. and the furnace residence time was 15 minutes. A constant nitrogen purge was maintained at 8.1 feet per minute. Gas diffusivity values were calculated as described in Example 1. A carbon sieve having the following physical characteristics was produced:

| | | |
|---|---|---|
| (A) | oxygen diffusivity × $10^{-8}$ cm$^2$/sec | 711 |
| (B) | oxygen/nitrogen Selectivity ratio | 7.34 |
| (C) | oxygen capacity cc/g | 8.64 |
| (D) | oxygen capacity cc/cc | 5.89 |
| (E) | apparent density g/cc | 0.682 |

EXAMPLE 7

Coconut char was fed to the furnace at 30 pounds per hour. The furnace temperature was 1850° F. and the furnace residence time was 45 minutes. A constant nitrogen purge was maintained at 5.8 feet per minute. Gas diffusivity values were calculated as described in Example 1. A carbon sieve having the following physical characteristics was produced:

| | | |
|---|---|---|
| (A) | oxygen diffusivity × $10^{-8}$ cm$^2$/sec | 605 |
| (B) | oxygen/nitrogen selectivity ratio | 8.8 |
| (C) | oxygen capacity cc/g | 7.44 |
| (D) | oxygen capacity cc/cc | 5.18 |
| (E) | apparent density g/cc | 0.697 |

EXAMPLE 8

Coconut char was fed to the furnace at 48 pounds per hour. The furnace temperature was 1830° F. and the furnace residence time was 25 minutes. A constant nitrogen purge was maintained at 5.9 feet per minute. Gas diffusivity values were calculated as described in Example 1. A carbon sieve having the following physical characteristics was produced:

| | | |
|---|---|---|
| (A) | oxygen diffusivity × $10^{-8}$ cm$^2$/sec | 791 |
| (B) | oxygen/nitrogen selectivity ratio | 6.9 |
| (C) | oxygen capacity cc/g | 6.80 |
| (D) | oxygen capacity cc/cc | 4.43 |
| (E) | apparent density | 0.652 |

EXAMPLE 9

As a comparison for the carbon molecular sieves produced by the instant invention, a prior art process (1) was reproduced as follows:

Dried coconut shell was charred in a silica boat by heating at 5° C./minute up to 500° C. in a stream of nitrogen. The char was crushed and sieved and a 20×40 mesh (U.S. sieve) fraction was heat treated in a fluidized bed in a nitrogen atmosphere heating at a rate of 5° C. per minute up to 950° C. and held at 950° C. for 2 hours. Gas diffusivity values were calculated as described in Example 1. The molecular sieve thus produced had the following physical characteristics:

| | | |
|---|---|---|
| (A) | oxygen diffusivity × $10^{-8}$ cm$^2$/sec | 2786 |
| (B) | oxygen/nitrogen selectivity ratio | 7.8 |
| (C) | oxygen capacity cc/g | 1.17 |
| (D) | oxygen capacity cc/cc | 0.8 |
| (E) | apparent density g/cc | 0.681 |

(1) See S. P. Nandi and P. L. Walker, Jr., Fuel 54 169 (1975).

Comparison of these prior art molecular sieve characteristics with those of the present invention shows a major difference. The prior art process of heating coconut char at 1742° F. (950° C.) for 2 hours under nitrogen generated a carbon sieve with a high oxygen diffusivity value, high oxygen/nitrogen selectivity but very low oxygen capacity. The present process maximizes both capacity and selectivity without restricting diffusivity to unreasonably low levels.

Claims to the invention follow.

What is claimed is:

1. A process for the continuous manufacturing of carbon molecular sieves having average effective pore diameters of from 2 to 15 Angstroms and an oxygen/nitrogen selectivity ratio of from 5.0 to 8.5 which comprises continuously feeding a charred naturally occurring substrate to a transport means for heating said substrate and heating said substrate at a maximum oxygen content of 500 ppm under non-activation conditions, without the use of an externally added pore blocking substance, at a temperature range of about 900° F. (482° C.) to 2000° F. (1093° C.) for a time period of about 5 to 90 minutes.

2. The process of claim 1, wherein said naturally occurring substrate is selected from the group consisting of coconut char, babassu nut char, anthracite and high ranking bituminous coals.

3. The process of claim 1, wherein the substrate is coconut char.

4. The process of claim 1, wherein said temperature range is from about 1400° F. to 1900° F. and said time period is from about 5 to 30 minutes.

5. The process of claim 1, wherein said heating means is an electrically powered, infrared heated continuous transport type furnace.

6. The process of claim 1, wherein said substrate is an agglomerated substrate.

7. The process of claim 1, wherein said non-activation conditions include an oxygen-free environment of less than 100 ppm oxygen and an inert, countercurrent, gas purge at a linear velocity of 3.5 to 8.1 feet per minute.

8. The process of claim 1, wherein said carbon molecular sieves have an average effective pore diameter of about 3 to 5 Angstroms.

9. The process of claim 8, wherein said temperature range is from about 1800° F. to 1900° F. and the time period is from about 15 to 30 minutes.

10. The process of claim 8, wherein said substrate is selected from the group consisting of coconut shell, babassu nut shell, anthracite and high ranking bituminous coal.

11. The product produced by the process of claim 1.

12. A carbon molecular sieve, useful for separating gas or liquid mixtures containing components of at least two different molecular diameters, molecular weights or molecular shapes which has the following physical characteristics:
   (a) an apparent density of from 0.60 to 0.70 g/cc,
   (b) an oxygen diffusivity ($\times 10^{-8}$) of from 500 to 900 cm$^2$/sec,
   (c) an oxygen/nitrogen selectivity ratio of from 5.0 to 8.5
   (d) an oxygen capacity of from 4.00 to 6.00 cc/cc, and
   (e) an average effective pore diameter of about 3 to 5 Angstroms.

13. A carbon molecular sieve of claim 12 which has the following physical characteristics:
   (a) an apparent density of from 0.64 to 0.70 g/cc,
   (b) an oxygen diffusivity ($\times 10^{-8}$) of from 650 to 750 cm$^2$/sec, and
   (c) an oxygen/nitrogen selectivity ratio of from 7 to 7.5.

* * * * *